United States Patent [19]

Smith et al.

[11] 3,924,941

[45] Dec. 9, 1975

[54] CASSETTE AND CASSETTE HOLDER FOR IMPROVED CONTROLLED-READING DEVICE

[75] Inventors: Elliott P. Smith, Wilmington, Del.; Robert H. Wachsmuth, Elkins Park, Pa.; Leonard Skolnick, Harwood, Md.

[73] Assignee: McGraw-Hill, Inc., New York, N.Y.

[22] Filed: Dec. 13, 1973

[21] Appl. No.: 424,286

Related U.S. Application Data

[62] Division of Ser. No. 323,968, Jan. 15, 1973, Pat. No. 3,862,799.

[52] U.S. Cl. .............................. 352/78 R; 352/126
[51] Int. Cl.² ......................................... G03B 23/02
[58] Field of Search ........ 352/78 R, 78 C, 126, 127, 352/128

[56] References Cited
UNITED STATES PATENTS

| | | | |
|---|---|---|---|
| 1,914,214 | 6/1933 | Porter | 352/78 R |
| 2,380,088 | 7/1945 | Tickell | 352/126 |
| 3,284,155 | 11/1966 | Jensen | 352/126 X |

*Primary Examiner*—Monroe H. Hayes
*Attorney, Agent, or Firm*—Dorfman, Herrell and Skillman

[57] ABSTRACT

A film cassette in the form of an elongated hollow box is provided with a continuous loop of film having sprocket perforations for advancement of the film. The loop extends around guides at opposite ends and one intermediate run of the film is twisted approximately 90° about its longitudinal axis and is passed between guides holding the film in a plane perpendicular to and on center with the lens axis. The film run passes an opening in the cassette walls at a predetermined position along its length to permit projection and through which a film positioning element may project. The film run also passes an opening in the casing through which a sprocket wheel drive may project to drive the film by its perforations. The cassette is provided with a predetermined cross-section corresponding in shape to a guide in the projector frame for receiving the cassette so that its cross-sectional form will determine a unique orientation for the cassette within the guide.

9 Claims, 9 Drawing Figures

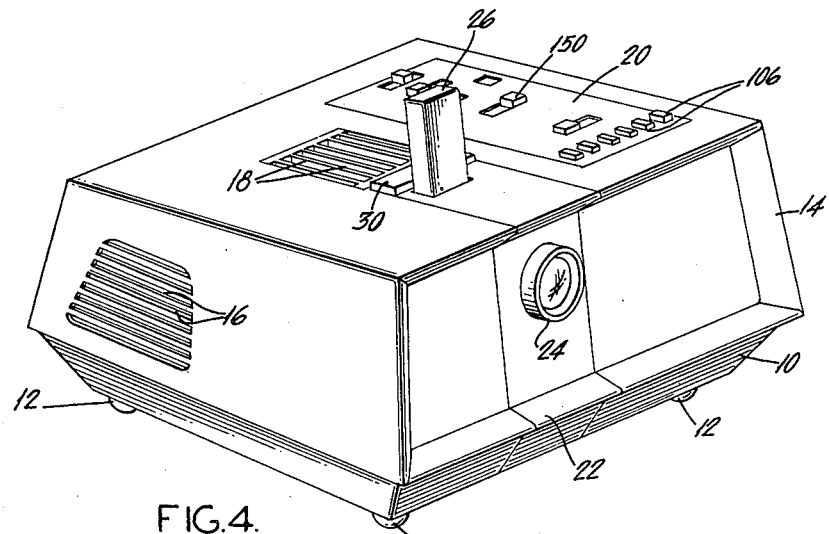
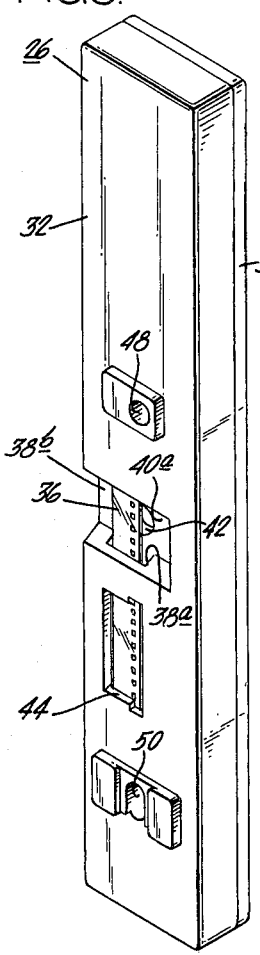
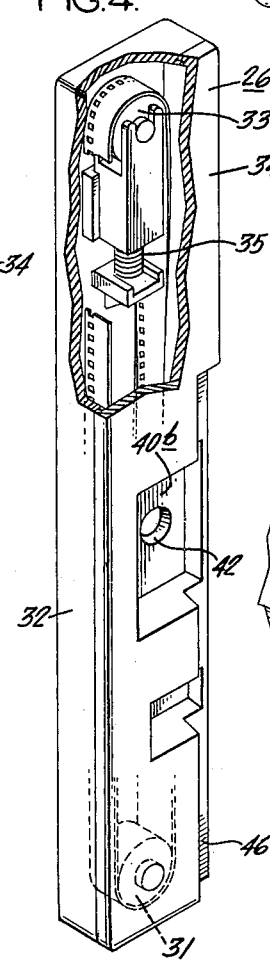
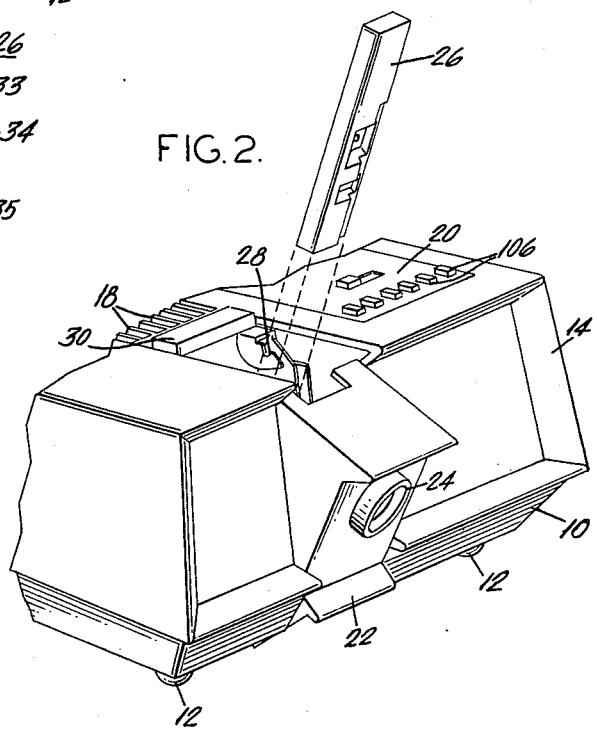

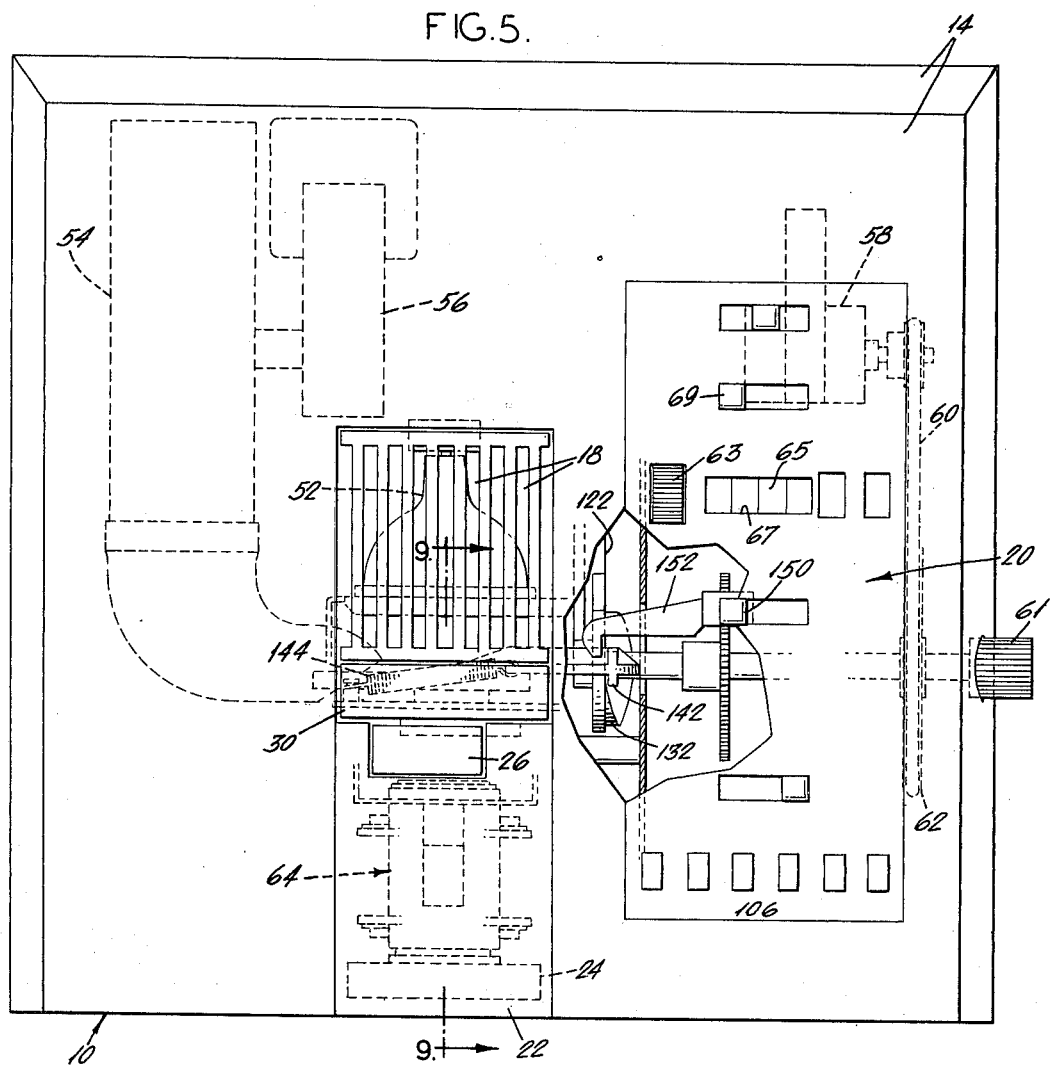

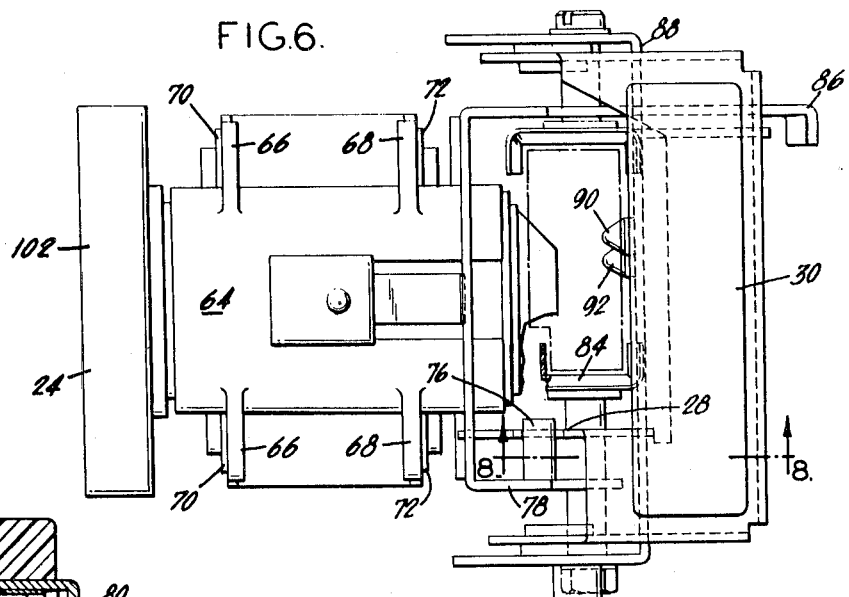
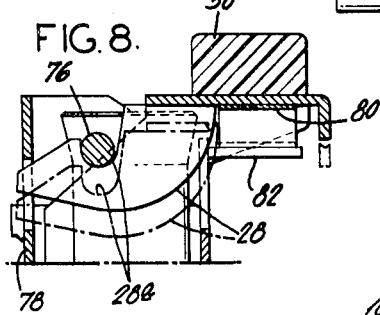
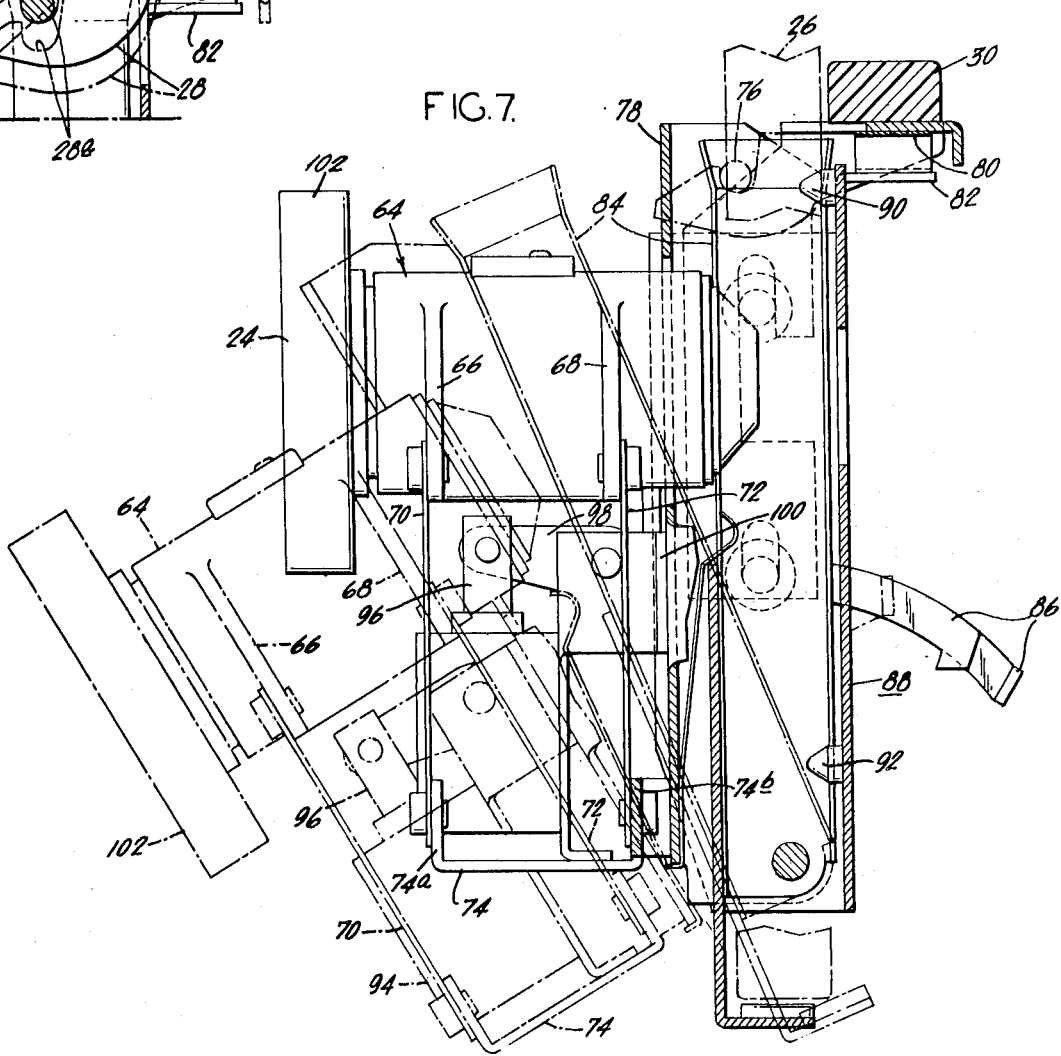

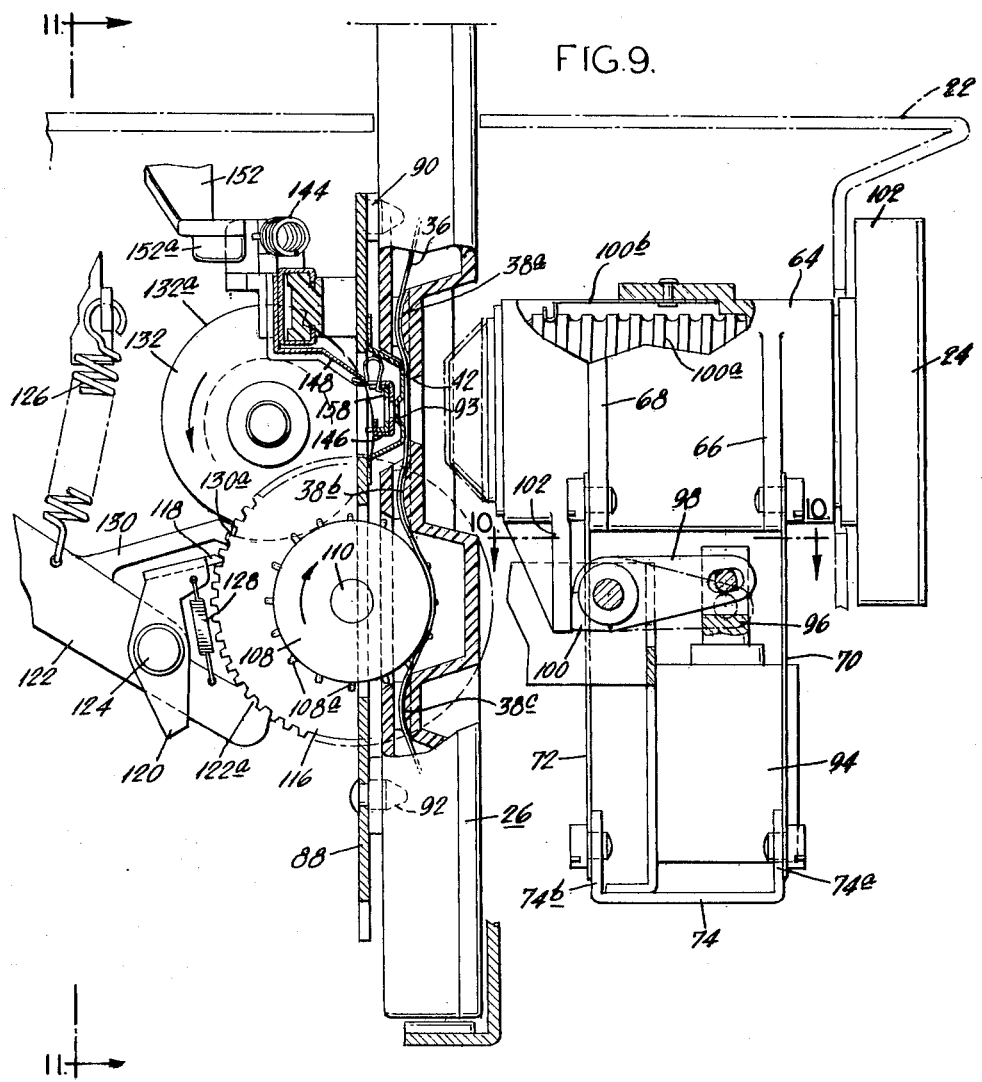

CASSETTE AND CASSETTE HOLDER FOR IMPROVED CONTROLLED-READING DEVICE

This is a division of the earlier application Ser. No. 323,968 filed Jan. 15, 1973 for "Improved Controlled-Reading Device," now U.S. Pat. No. 3,862,799.

The present invention relates to improvements in a cassette for a new improved controlled-reading projector described in the earlier application Ser. No. 323,968.

In the prior art, controlled-reading projectors have been largely modifications of film strip projectors. A highly successful modification providing a controlled-reading projector is shown in U.S. Pat. No. 2,745,313, wherein diametrically opposed helical grooves cut into a tubular member served to provide an effective moving aperture for a conventional film strip projector using a special power takeoff to drive the tubular element.

The controlled-reading projector disclosed in application Ser. No. 323,968 is designed specifically for the purpose, rather than being an adaptation of another projector. As such it provides features which may be useful in other applications, but which are particularly desirable for educational purposes where easily-handled, easily-operated, simple, easily-repairable structures are very much to be desired. This projector permits the use of a film cassette of the present invention for ease in handling and fool-proof operation. The cassette and projector are designed to use smaller film sizes and, therefore, to provide more information in smaller space and much more information within a cassette that had previously been available in much longer film strips. The present invention also provides accurate, easy-loading of the projector with good precision and film perforation alignment so that the user never has to be concerned about matching perforations with the sprocket wheel.

More specifically, in accordance with the present invention a film cassette is provided by elongated hollow box of standardized fixed dimensions to contain a continuous loop or strip of film having sprocket perforations for advancing the film. The loop extends around guides within said hollow box near opposite ends thereof, is twisted at 90° in at least two places and is resiliently biased into a taut loop. Film guides hold the position of the film which has been twisted in line with and generally perpendicular to the lens axis along which the cassette walls are removed to permit projection of the film and also hold the film in position opposite an opening in the casing through which a sprocket wheel drive projects to drive the film by its perforation. Positive film drive and proper alignment is possible because the cassette is positioned and held fixed with regard to the projector and the film in the cassette is resiliently urged into a taut loop. The taut loop causes the film to align with the projection aperture plate and to conform to and assure positive engagement with the sprocket wheel, both of which projector components have entered the cassette for such engagement.

For a better understanding of the present invention reference is made to the following drawings in which FIG. 1 is a perspective drawing of a preferred embodiment of a projector in accordance with the present invention with the cassette in position for operation;

FIG. 2 is a partial perspective view of the same projector showing the film cassette guide open and the cassette removed;

FIG. 3 is a perspective view of the film cassette of the present invention from the sprocket-engaging side;

FIG. 4 is a perspective view of the cassette of the present invention from the opposite side, partially broken away to show a portion of its interior structure;

FIG. 5 is a plan view from above of the projector structure in accordance with the present invention, showing part of the structure broken away to show the slide-moving mechanism and showing some of the controls in full plan and some of the structural orientation within the casing in dashed lines;

FIG. 6 is a plan view from above with the cover removed showing the lens and cassette guide structures;

FIG. 7 is a side elevational view showing the operation of the film guide and associated structure in closed position with the open position of the same structure shown in dot-and-dashed lines;

FIG. 8 is a detailed sectional view taken along line 8—8 of FIG. 6;

FIG. 9 is a sectional view taken along line 9—9 of FIG. 5, with the cover and lens housing shown in broken lines;

Referring first to FIGS. 1 and 2, the improved controlled-reading projector with the cassette of the present invention is shown as it would be seen in normal use. As appears in FIGS. 1 and 2, the projector has an inverted truncated pyramidal base 10, provided with suitable foot pads 12. The structure is mounted on the base following which a cover 14, also of truncated pyramidal form, is placed in position to conceal the internal construction. Suitable louvers 16 and 18 may be provided adjacent the blower and projection lamp locations respectively. A control panel generally designated 20 is provided at one side on the top within which are group operational pushbuttons and actuators which will be described herein in connection with their uses for control of the projector. A separate lens housing 22 conforming to the base 10 and cover 14 to provide a smooth contour when in place as shown in FIG. 1, is pivotally connected to the base 10 to permit its forward rotation as shown in FIG. 2. A lens 24 extends beyond the cover and is rotatable to effect the focus. A generally vertically extending film cassette guide 84 (see FIGS. 2 and 7) is located immediately behind the lens housing and also is pivotally supported on the projector base 10 by separate hinging means. When the lens housing is moved to the position shown in FIG. 2, the guide also tends to move forward into a position in which the film cassette, generally designated 26, may be readily removed or readily inserted, or reinserted for use. The cassette is properly placed in the guide by simply inserting the cassette in proper orientation within the guide 84 and allowing it to fall by gravity into place. The lens housing may then be moved back into the position of FIG. 1, moving the guide means with it and positioning the cassette in the operating position shown in FIG. 1. Latching means 28, supported on the frame to which the cover is connected, engages catch means on the lens housing 22 and thus holds the lens housing and cassette guide latched into the position of FIG. 1 until the latch is released by pressing release button 30 to permit the lens housing 22 and the cassette guide 84 to again move forward.

A preferred embodiment of cassette of the present invention is shown in FIGS. 3 and 4 which clearly show that the cassette 26 is an elongated housing, in this case composed of pieces 32 and 34, which together provide a cavity in which a continuous loop of film 36 is located. The film is preferably of a super-8mm size, rather than the 35mm film commonly used with film strip projector and this allows the same amount of information to be placed on a smaller amount of film. The film loop passes over guides which may consist of rollers 31, 33 near the opposite ends of the hollow casing. One of the rollers 33 is movable and spring-tensioned using compression spring 35 to preserve tautness in the loop. In at least one of the runs of the loop, the run is twisted approximately 90° about the film axis to rotate the face of the film into the plane of the loop. Ordinarily the cassette has a thickness corresponding to the width of the film. The portion of the film which is twisted at 90° is preserved in this orientation over one or more frames of the film by film guides. The film guides consist of channel-shaped portions molded into the housing which channels confine the edges of the film and provide a curved base contacting the film on the inside of the loop to provide a reference relative to which the film may be inwardly displaced by structure pressing inwardly from outside the loop. The rounded bottoms of film guides 38a, 38b, and 38c may best be seen in FIG. 9. In the twisted plane defined by these guides the film is located in line with and generally perpendicular to the axis of projection. Along the lens axis the housing is cut away with opposed recesses 40a and 40b connected by an intermediate aperture 42 sufficient to permit the projection of an image therethrough. Similarly, another portion of the film is exposed in an opening 44, which is designed to be of such dimensions as to accomodate a driving sprocket wheel which engages the sprocket perforations in the film within that opening. As shown in FIG. 9, the film guides 38b and 38c each side of the opening hold the film in place. The loop yields as the sprocket wheel engages with the film perforations and that engagement is made firm by resistance of the resilient spring means 35, tensioning the loop.

The cassette 26 is also provided with a unique cross-sectional shape to put the guide means in that unique orientation which will cause it to cooperate properly with the projector. It will be noted that in the embodiment of FIG. 4 one corner is cut away and an inverted inside corner channel 46 provided. As best seen in FIG. 6 one side channel of the guide means 84 has been shortened to provide a guide conforming to the cross-section of the cassette in proper orientation. To prevent the cassette from being inserted upside-down, the channel 46 runs only part way up the length of the cassette. The conforming guide prevents the cassette from being inserted when right side up in any other orientation. It will be clear however, that the guide need not conform exactly in order to accomplish this purpose, and, for example, might simply provide a bevelled wall cutting across the corner corresponding to the channelled corner of the cassette. Cassettes of other shapes and forms might of course be made to conform to a guide means of selected form in other embodiments. Furthermore, as shown in FIGS. 6, 7 and 9, positioning guide holes 48 and 50 in the cassette (in locations seen in FIG. 3) are provided to receive guide pins 90 and 92 which project from the housing and align the cassette properly within the guide means 84 to properly mesh with the sprocket wheel and properly align the film with the aperture plate 93.

Referring to FIG. 5 the plan view from above shows much of the structure shown in FIGS. 1 and 2 and additionally shows, in phantom lines, standard structure of a projector as adapted to this particular improved controlled reading projector. In particular lamp 52, blower 54, drive motor 56 for said blower and associated duct work are shown. Similarly adjustable speed motor means 58 providing drive through pulleys and belt 60 to a system of control gears driven by pulley 62 operates the apertured slide and shutter and the intermittently moving sprocket wheel to drive the film. Motor speed is selected by knob 63 the knurled edge of which is exposed through a slot in the top cover for finger tip rotation. Associated with knob 63 is calibrated drum 65 bearing adjacent columns of numbers which are displayed through an elongated slot 67 in the cover to show comparable word rates per minute for various numbers of words per line shown on the cover at the corresponding column on the drum. The calibration is such that for a motor speed selected by knob 63 the figures on the drum 65 displayed in the slot 67 indicate the words per minute for a range of words per line. Therefore, if the words per line are known for a given cassette film, the words per minute displayed and read by the student will be directly readable from the drum. A dual speed transmission operated by shift lever 69 is provided to permit selection of various speed ranges. Calibration of words per minute must, therefore, provide alternative scales for various possible speed ranges. An auxiliary manual drive is provided by a thumb wheel 61 projecting from the cover 14.

Details of the latch are shown in FIG. 8 in full lines in engaged position, and in dot-dash lines in release position. As seen in that figure, a groove 28a engages a latch pin 76 on the front of the frame structure 78, attached to the lens housing. As seen in FIG. 8 the latch member 28 is an extension of the actuator 30, which is normally urged upwardly by a leaf spring 80 away from a sheet metal member 82 attached to the housing. When the actuator 30 is depressed the latch member is moved downwardly to the dot-dash position in FIG. 8, thus releasing the latch pin 76 and allowing the lens housing 22, and the lens mount 64 contained therein as seen in FIG. 7, to move from the solid line position to the dot-dash position shown in that figure. At the same time, the guide means 84, which is preferably in the form of opposed U-channels having an open top, and conforming to the shape of the cassette, moves away from the sprocket engaging position shown in full lines to the cassette-removing or — inserting position shown in dot-dash lines. Preferably also, the housing is provided with stop means 86, which eventually engages a vertical wall 88 forming part of the frame to limit the forward or outward motion of the lens housing and the cassette guide. The conical pins 90 and 92, also shown on frame member 88 are the mating positioning members entering guide holes 48 and 50 to establish alignment of the cassette when the guide means 84 is raised to the solid line position. These pins engage the guide holes 48 and 50 as the guide means is closed into the operative position and the conical shape of the pins insure that by the time the guide means is fully closed the sprocket wheel 108 engages in the perforations in the film and the aperture plate 93 is properly oriented with respect to the film.

Within the lens housing and movable therewith, is a generally standard lens system 24 in lens mount 64, which, however, is supported on the lens housing and hence on the frame when in latched position, in a novel and improved way. Specifically, as shown in FIGS. 5, 7 and 9 the lens mount is provided with parallel lugs 66 and 68 to which are connected resilient sheet metal flexures 70 and 72. These flexures are arranged parallel to one another and are fixed at their opposite ends to the legs 74a and 74b of U-shaped bracket 74. Bracket 74, in turn, is fixed to the lens housing and may be considered part of the frame, at least when the lens housing is connected rigidly thereto by the latch 28.

Now considering the projector lens 24 contained within the lens mount 64, it will be observed in FIG. 9 that a solenoid actuator means 94 is provided on the bracket 74 so as to preserve its orientation with respect to the lens housing. Solenoid 94 drives plunger 96 which through suitable linkage 98 acts upon the lens mount 64 to move the lens axially from the position shown to a position rearward of that position. It is possible to focus and defocus lens 24 by rotating ring 102 thereof. Helical thread 100a on lens 24 and flexible thread guide 100b on lens mount 64 causes the lens to translate toward or away from the film as the result of such rotation. By this means the lens 24 is arranged so that the image is out of focus in one position, preferably the deenergized position of the solenoid, and the image is in focus in the energized position of the solenoid. It is then possible, by connecting the solenoid into timing circuits, to time the period for which the solenoid is engaged and hence the time when the image is in focus, so that an observer will have a specified limited time to read, or observe the projected image. A row of selector switch pushbuttons 106 may be used to actuate certain predetermined RC timing circuits to achieve selected "on" time of the solenoid for this purpose. The solenoid achieves this novel result by this simple expedient due to the construction of the resilient parallel flexure support on the lens.

Because the drive system and the gearing in the gear box is largely conventional, much of the interconnection between the motor 58 and the drive system in omitted and only so much is shown to give an understanding of the operation and novel parts of the system. The sprocket wheel previously referred to is best seen in FIG. 9 as wheel 108 having sprocket teeth 108a arranged around its periphery. The sprocket wheel 108 is supported on a shaft 110 which may be provided with a bearing 112 supported on wall 88 of the support frame. Shaft 110 also support toothed ratchet wheel 116 which, as best seen in FIG. 9, is intermittently engaged and driven by pawl 118. Pawl 118 is an integral part of lever 120 which is supported to linkage 122 by pivot 124. Linkage 122 is pivotally supported at its remote end (not shown), to some portion of the frame structure. At its opposite end it is provided with teeth which normally engage the ratchet wheel 116 and insure positive indexing at specified angular positions. It is normally held in such engagement by spring member 126 connected between it and the frame. The pawl 118 is held engaged because of a spring connection between its lever 120 and linkage 122, provided by spring 128. The linkage is provided with an offset arm 130, the end 130a of which serves as a cam follower of the outside peripheral cam surface 132a of cam wheel 132, which rotates in the direction shown by the arrow in FIG. 9 as a result of appropriate connection to the motor drive means 58. In the position shown, the cam is follower 130a just past a discontinuity. At a predetermined place along the track of cam 132a the teeth 122a on the end of linkage of 122 will disengage the teeth of the ratchet wheel 116. Subsequently as the cam follower 130a passes the discontinuity in the cam pawl 118 will move the ratchet wheel one notch and the teeth 122a will immediately reengage. Thus each one-half revolution of the cam 132, the ratchet wheel is advanced an amount corresponding to one tooth on the ratchet wheel 116 and the sprocket wheel is correspondingly advanced, thereby advancing the film in the film cassette by the amount, which corresponds to a line of print.

In connection with FIG. 9 it should be observed that when the cassette 26 is in the position shown, the sprocket wheel 108 actually enters the cassette and deflects the film against tension provided for the loop within the cassette in order to give positive drive. Similarly, aperture plate 93 enters the recess 40a along the lens axis and holds the film in aligned position so that the film will be in a fixed plane at all times during projection.

The single preferred embodiment of the present invention has been described in some detail with regard to those parts of the structure which are considered to be new. It will be clear to those skilled in the art that the structures shown are merely representative and that obvious modifications can be made to each of the structures and substitutions will readily occur to one skilled in the art. All modification of the structure shown and described within the scope of the claims are intended to be within the scope and spirit of the present invention.

I claim:

1. A film cassette for a continuous film loop without reel means comprising:
    an elongated hollow housing of standardized fixed dimensions having at least projecting and driving apertures for projecting the film through the housing and for admitting drive means to the housing,
    a continuous single taut loop of film within said housing having sprocket perforations for advancing the film longitudinally,
    guide means within said holder including end guide means adjacent opposite ends of the elongated housing about which said film loop extends defining an elongated narrow loop path without the film contacting itself, including at least one movable guide means within said holder along said path and further guide means intermediate said end guide means along said loop path positioned to gradually twist at least one run of said loop substantially 90° about its longitudinal axis so that the film is generally parallel to planes normal to the film in the rest of the loop as the film loop path passes the projecting and driving apertures, and back again into its initial plane beyond said apertures,
    resilient tensioning means urging said movable guide means into said loop path in such direction as to render said loop taut and apply tension through the entire length of the continuous loop of film which tension facilitates cooperation with the drive and projection elements of a projector.

2. The film cassette of claim 1 in which the projecting aperture extends completely through the housing in a region of said at least one run of said loop twisted at 90° at a level aligned with the lens axis when the cassette is in projecting position in a projector and the aperture is of such size and arrangement to permit entry of alignment means into the cassette into contact with the film for holding the film in a fixed predetermined plane.

3. The film cassette of claim 2 in which guide means holding the film laterally as well as in its loop path are provided each side of the projection aperture such that entry into the cassette of alignment means will deflect the film against the tension of the resilient tensioning means from its loop path between the guide means on each side of the aperture normally defining the plane of the film in that portion of its loop path to thereby provide an alignment force within the cassette.

4. The film cassette of claim 1 in which the driving aperture is an opening in the housing opposite sprocket perforations in the film in a region of said at least one run of said loop twisted at 90° whereby drive means may enter the housing to drive the film by said perforations.

5. The film cassette of claim 4 in which guide means holding the film laterally as well as in its loop path are provided each side of the projection aperture such that entry into the cassette of drive means will deflect the film from its loop path between the guide means on each side of the driving aperture against the tension of the resilient tensioning means to thereby provide an alignment force within the cassette.

6. The film cassette of claim 5 in which the aperture is of such size and configuration as to permit entry of a sprocket wheel to drive said film.

7. The cassette of claim 1 in which the elongated housing has a form extending from one end for a predetermined distance providing a cross-section transversse to its length which is asymmetrical and of such form as to permit lengthwise insertion in only one orientation into a projector guide of predetermined conforming form.

8. The cassette of claim 7 in which the asymmetrical cross-section permitting insertion into said projector guide is provided only at one end and the other end has a form which does not permit insertion into the guide whereby the cassette may not be inserted upside down.

9. The film cassette of claim 3 in which lateral guide means are also provided each side of the aperture to preserve lateral alignment of the film.

* * * * *